United States Patent
Nieuwenhuis et al.

(10) Patent No.: US 10,571,721 B2
(45) Date of Patent: Feb. 25, 2020

(54) COMPUTER-IMPLEMENTED METHOD FOR DETERMINING A REPRESENTATION OF A RIM OF A SPECTACLES FRAME OR A REPRESENTATION OF THE EDGES OF THE SPECTACLE LENSES

(71) Applicants: Carl Zeiss Vision International GmbH, Aalen (DE); Carl Zeiss AG, Oberkochen (DE)

(72) Inventors: Claudia Nieuwenhuis, Aalen (DE); Christian Wojek, Aalen (DE); Oliver Schwarz, Ellwangen (DE)

(73) Assignees: Carl Zeiss Vision International GmbH, Aalen (DE); Carl Zeiss AG, Oberkochen (DE)

( * ) Notice: Subject to any disclaimer, the term of this patent is extended or adjusted under 35 U.S.C. 154(b) by 0 days.

(21) Appl. No.: 16/522,101

(22) Filed: Jul. 25, 2019

(65) Prior Publication Data
US 2020/0018995 A1 Jan. 16, 2020

Related U.S. Application Data

(63) Continuation of application No. PCT/EP2018/051729, filed on Jan. 24, 2018.

(30) Foreign Application Priority Data

Jan. 27, 2017 (EP) .................................. 17153557

(51) Int. Cl.
*G02C 13/00* (2006.01)
*G06T 17/10* (2006.01)
(Continued)

(52) U.S. Cl.
CPC ....... *G02C 13/005* (2013.01); *G02B 27/0093* (2013.01); *G06F 3/012* (2013.01);
(Continued)

(58) Field of Classification Search
CPC ..... G02C 13/005; H04N 13/282; G06T 17/10
(Continued)

(56) References Cited

U.S. PATENT DOCUMENTS

| 8,351,672 B2 * | 1/2013 | Tao .................. G01N 21/94 250/370.01 |
| 8,928,870 B2 * | 1/2015 | Nozawa ............. G01M 11/0235 356/124 |

(Continued)

FOREIGN PATENT DOCUMENTS

DE 102011115239 B4 2/2016

OTHER PUBLICATIONS

Hartley et al.: "Multiple View Geometry in Computer Vision," 2nd edition, pp. 1 to 8, Cambridge University Press 2004.
(Continued)

*Primary Examiner* — Christopher W Fulton
(74) *Attorney, Agent, or Firm* — Thrive IP®; Georg Hasselmann

(57) ABSTRACT

A computer-implemented method for determining a representation of a rim of a spectacles frame or a representation of the edges of the spectacle lenses is disclosed, wherein at least two calibrated images taken from different viewing angles of a head a subject wearing the spectacles frame or the spectacles are provided, and wherein data for at least portions of the rims of the spectacles frame or the edges of the lenses are detected in each image. Further, a three-dimensional model of the spectacles frame or the spectacles is provided, based on geometric parameters, and the geometric parameters are optimised to adapt the model to the detected edges.

23 Claims, 4 Drawing Sheets

(51) Int. Cl.
*G02B 27/00* (2006.01)
*H04N 13/282* (2018.01)
*G06N 3/04* (2006.01)
*G06Q 30/02* (2012.01)
*G06F 3/01* (2006.01)

(52) U.S. Cl.
CPC ....... *G06N 3/0472* (2013.01); *G06Q 30/0206* (2013.01); *G06T 17/10* (2013.01); *H04N 13/282* (2018.05)

(58) Field of Classification Search
USPC ................ 33/200, 507; 382/141; 702/155
See application file for complete search history.

(56) References Cited

U.S. PATENT DOCUMENTS

| | | | | |
|---|---|---|---|---|
| 9,031,314 | B2* | 5/2015 | Clausen | G01B 11/25 382/151 |
| 9,076,209 | B2* | 7/2015 | Choukroun | G06T 19/00 |
| 10,441,168 | B2* | 10/2019 | Nieuwenhuis | G02C 13/005 |
| 2003/0081173 | A1 | 5/2003 | Dreher | |
| 2004/0197016 | A1* | 10/2004 | Littlefield | G01N 29/225 382/128 |
| 2006/0055699 | A1* | 3/2006 | Perlman | G06K 9/00255 345/473 |
| 2012/0268571 | A1* | 10/2012 | Debevec | H04N 13/282 348/48 |
| 2015/0055085 | A1 | 2/2015 | Fonte et al. | |
| 2015/0304530 | A1 | 10/2015 | Courteille et al. | |

OTHER PUBLICATIONS

Din En ISO 13666 (Ophthalmic optics—Spectacle lenses), dated Oct. 2013.
Extended European Search Report issued in EP 17 153 557.8, to which this application claims priority, dated Jul. 20, 2017.
International search report issued in international application PCT/EP2018/051729, to which this application claims priority, and English-language translation thereof, dated May 3, 2018.
International Search Report issued in PCT/EP2018/051729, to which this application claims priority, dated Apr. 24, 2018, and English-language translation thereof.
International Preliminary Examination Report issued in PCT/EP2018/051729, to which this application claims priority, dated Jan. 8, 2019, and English-language translation thereof.

* cited by examiner

COMPUTER-IMPLEMENTED METHOD FOR DETERMINING A REPRESENTATION OF A RIM OF A SPECTACLES FRAME OR A REPRESENTATION OF THE EDGES OF THE SPECTACLE LENSES

CROSS REFERENCE TO RELATED APPLICATIONS

This application is a continuation application of international application PCT/EP2018/051729, filed Jan. 24, 2018, which claims priority to European patent application EP 1753557.8, filed Jan. 27, 2017, both of which are hereby incorporated by reference in their entireties.

TECHNICAL FIELD

The disclosure relates to a computer-implemented method for determining a representation of a spectacle frame edge or a representation of the edges of the lenses of a pair of spectacles, based on at least two images, recorded from different directions of view, of a head wearing the spectacle frame or the spectacles.

BACKGROUND

Methods that find the associated contours in image recordings for a given tracer data record are known. In the process, use is made of image-based methods such as pattern searches or template matching. Reference is made to the disclosure of DE 10 2011 115 239 B4 in exemplary fashion. A disadvantage of this solution is that the tracer data record, and hence the worn spectacles, must be known in order to find the contours in the recorded images. However, the typical workflow of the optician is such that tracer data of a frame are only produced once the customer has already selected the spectacles to be purchased. This means that these data are not available for all spectacles in the store when the customer stays in the store. Usually, the tracer data are additionally only determined in the evening after the customer has already left the store, so that there is no need for the customer to wait for this. Thus, the related art would require tracer data to be produced first before the centration can be carried out; this would change the workflow of the optician and take up the customer's time. Additionally, it is also inconvenient if every optician must store the tracer data record for each frame. Additionally, these data are typically only available in two-dimensional fashion but are usually required in three dimensions.

SUMMARY

It is therefore an object of the disclosure to develop a method of the type set forth at the outset in such a way that it can be used in more versatile fashion.

According to the disclosure, this object is achieved by a computer-implemented method as disclosed herein.

The disclosure is based on the concept of fully automatically and simultaneously detecting, in a plurality of views, the frame edge of a pair of spectacles on the head of a subject on the basis of a parametric three-dimensional spectacle model, the frame edge having been recorded in at least two recordings that were calibrated with respect to one another. Centration parameters can subsequently be calculated from this information. In the process, images calibrated with respect to one another are provided. The calibration thereof comprises the extrinsic properties of the cameras recording the images or the camera recording the images in succession, such as the relative alignment of their optical axes and the relative arrangement with respect to one another in space, and their intrinsic properties, i.e., the properties of the cameras themselves, which define how a point in space, which is situated in the internal coordinate system of the respective camera, is mapped onto the coordinates of the pixels of the recorded image. A detailed description of the calibration of cameras is found in the textbook entitled "Multiple View Geometry in Computer Vision" by Richard Hartley and Andrew Zisserman, 2nd edition, Cambridge University Press 2004, and, in particular, on page 8 therein. As a result of calibrating the images, it is possible to dispense with a measurement bracket, as used in the method according to DE 10 2011 115 239 B4. Moreover, a three-dimensional model of the spectacle frame or of the spectacles is provided, the model being based on geometric parameters that define the form of the spectacle frame or the spectacles. These geometric parameters are optimized for the purposes of fitting the model to the detected edges. A change in the parameters leads to a change in the form of the spectacle frame or the spectacles. Moreover, further geometric parameters can be optimized, for example those that define the orientation of the spectacle frame or the spectacles in space. As a rule, the representation of the spectacle frame edge or the representation of the edges of the lenses of the spectacles are used for determining centration parameters. Centration parameters are used to correctly arrange or center spectacle lenses in a spectacle frame, such that the spectacle lenses are arranged at the correct position relative to the eyes of the person wearing the spectacles. Here, these are in part anatomical parameters of the subject, such as, the interpupillary distance, in part purely frame-specific parameters, such as the lens width or the lens height, and in part combinations of anatomical and frame-specific parameters, such as, the vertex distance and the fitting point height. An overview of conventional centration parameters is provided by DIN EN ISO 13666, dated October 2013.

Proceeding from this general concept, the method according to the disclosure or the employed three-dimensional model can be simplified in various ways. Thus, it is typical for the images to consist of pixels and for a value mapping the probability of a pixel containing a part of the edges of the spectacle frame or of the lenses to be assigned to each pixel. As a result, the detection of the frame edges or lens edges is simplified.

A probability map mapping these probabilities can be calculated by means of, e.g., edge detectors (gradient filter, Canny edge detector, Laplace operator, Gabor filter, or machine learning-based edge detectors learned from exemplary data). As an alternative thereto, the edges of the spectacle frame or of the lenses can also be detected in the individual images, for example by means of a Hough transform, template matching, or various methods for segmenting the lens edge.

By way of example, a good possible approximation for the frame edges or the lens edges is obtained if the geometric parameters of the model describe straight lines approximately defining nasal and/or temporal edges of the spectacle frame or of the lenses. The spectacle frame or the spectacles can already be well defined to a first approximation on the basis of these straight lines. A further simplification of the model is provided by defining each frame edge or each lens as approximately lying in a plane. Further, the model can be represented by a spline.

Alternatively, the lenses can be approximated by means of higher order surfaces, e.g., paraboloids, as well; these describe the real lens form more accurately.

According to an exemplary embodiment of the disclosure, specific representations of the spectacle frame or of the lenses are generated from the model by choosing various model parameter sets and the specific representations are projected onto the recorded images. Here, these representations more particularly image prominent regions of the spectacle frame or of the lenses, such as the lens edges or nasal and/or temporal edges, for example. The projections are implemented for the purpose of optimizing the parameters of the model in such a way that the model fits to the recorded images and the data generated therefrom, more particularly the values mapping the aforementioned probability, or the previously detected frame and lens edges.

The geometric parameters of the model are typically optimized in stochastic or deterministic fashion utilizing a cost function. Cost functions were developed in the field of economics to be able to represent a relationship between costs on the one hand and parameters on the other hand. Cost functions are also referred to as so-called target functions, energy functions or functionals, loss functions, utility functions, or as fitness functions.

In economics, the costs are optimized by virtue of the parameters included in the cost function being varied until the cost function reaches a minimum. As an alternative, a target function can also be maximized. This principle can be transferred to the present problem by virtue of, for example, the cost function assessing the correspondence of the representations being projected onto the recorded images. Then, the corresponding deviations are included in the cost function. The value ascertained by the cost function, referred to as cost value below, can then be optimized.

Here, different optimization methods are used depending on the complexity of the cost function. Stochastic algorithms are often used in the case of complex cost functions, for example Markov chain Monte Carlo methods or simulated annealing methods. Deterministic optimization methods are usually used in the case of less complex cost functions, for instance gradient descent methods, simplex methods (e.g., Nelder-Mead methods), differential evolution methods, primal-dual approaches, graph theory methods, or discrete graph cut methods.

In contrast to a stochastic optimization method, a deterministic optimization method is free of random influences and calculates each time the same solution given the same start value.

In order to simplify the optimization, parameters can be determined from the image data and can be included in the model. By way of example, the position of the eyes in space can be determined by means of a geometric determination of position, wherein a triangulation method, in particular, can be used, and parameters defining the position of the eyes can thus be included in the model. Moreover, the model can be simplified by virtue of the value range of the geometric parameters being restricted and/or the number of geometric parameters being limited or reduced by prescribing assumptions in respect of the geometry of the spectacle frame or of the lenses and/or by prescribing assumptions or statistics in respect of facial or frame features.

By way of example, a geometry of the spectacle frame or of the lenses that is symmetric with respect to a central plane can be assumed. It is also possible to use a central line, determined in advance, between the lenses of the spectacles in the image in order to ensure the symmetry of the model, for example by virtue of the information that the intersection straight-line of the lenses approximated as planes must be projected onto this central line being included in the model. Alternatively, statistics about centration parameters, for example, could be present, from which it is possible to derive statistics about the geometric parameters of the model present, such as, statistics about the vertex distance can help to restrict the positioning of the frame to a small region in space at a certain distance from the eyes. Likewise, statistics about the value range of, e.g., face form angles or "as worn" pantoscopic angles can help to suitably restrict the value range of individual parameters of the model such that the optimization of the cost function is simplified, either by virtue of the optimization only being carried out over parameters within a certain typical value range or by virtue of the probability distribution about the parameter value range being directly included in the optimization (e.g., in the case of Markov chain Monte Carlo methods).

Moreover, the model may contain a probability distribution that specifies probabilities of possible values of the parameters. If the probability value for a parameter lies below a predetermined threshold, provision can be made for this parameter that was ascertained in the method to be discarded to reduce the dimension of the model, i.e., the complexity thereof.

Typically, the computer-implemented method according to the disclosure is carried out using an apparatus as described below.

The representation of the edge of the spectacle lens or the representation of the spectacle frame edge, ascertained according to the disclosure, is typically used for determining centration parameters, wherein the centration parameters determined in this manner are advantageously used for centering a spectacle lens in a spectacle frame and/or for grinding a spectacle lens into spectacle frame. Here, the at least one spectacle lens is centered in the spectacle frame using the determined centration parameters in one method step or the at least one spectacle lens is ground for an arrangement in the spectacle frame on the basis of the determined centration parameters. In this way, it is possible to produce spectacle lenses and spectacles.

BRIEF DESCRIPTION OF THE DRAWINGS

The disclosure will now be described with reference to the drawings wherein.

DESCRIPTION OF EXEMPLARY EMBODIMENTS

Figure 1A:
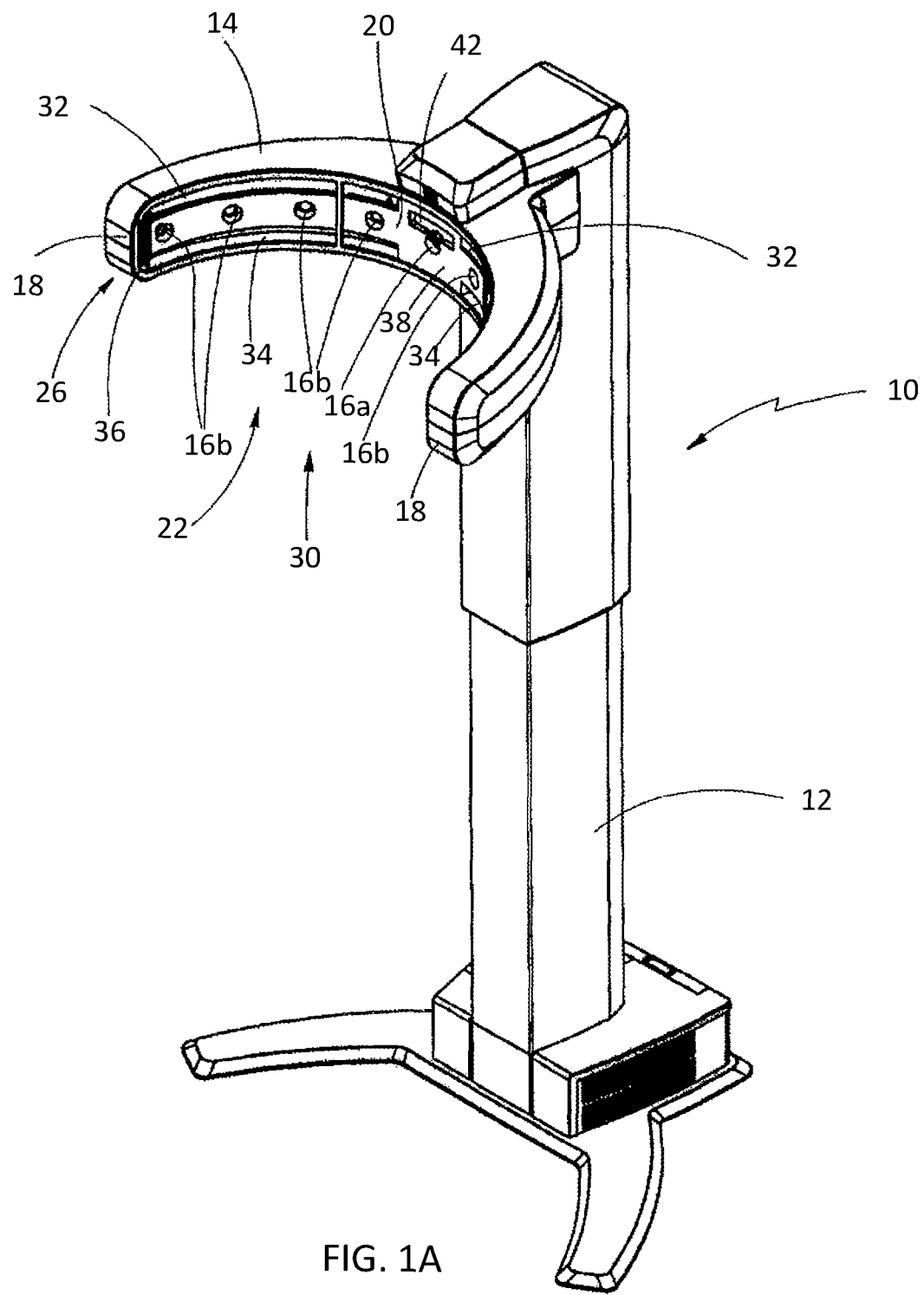
FIG. 1A shows an apparatus for determining centration parameters in a perspective view.
Figure 1B:
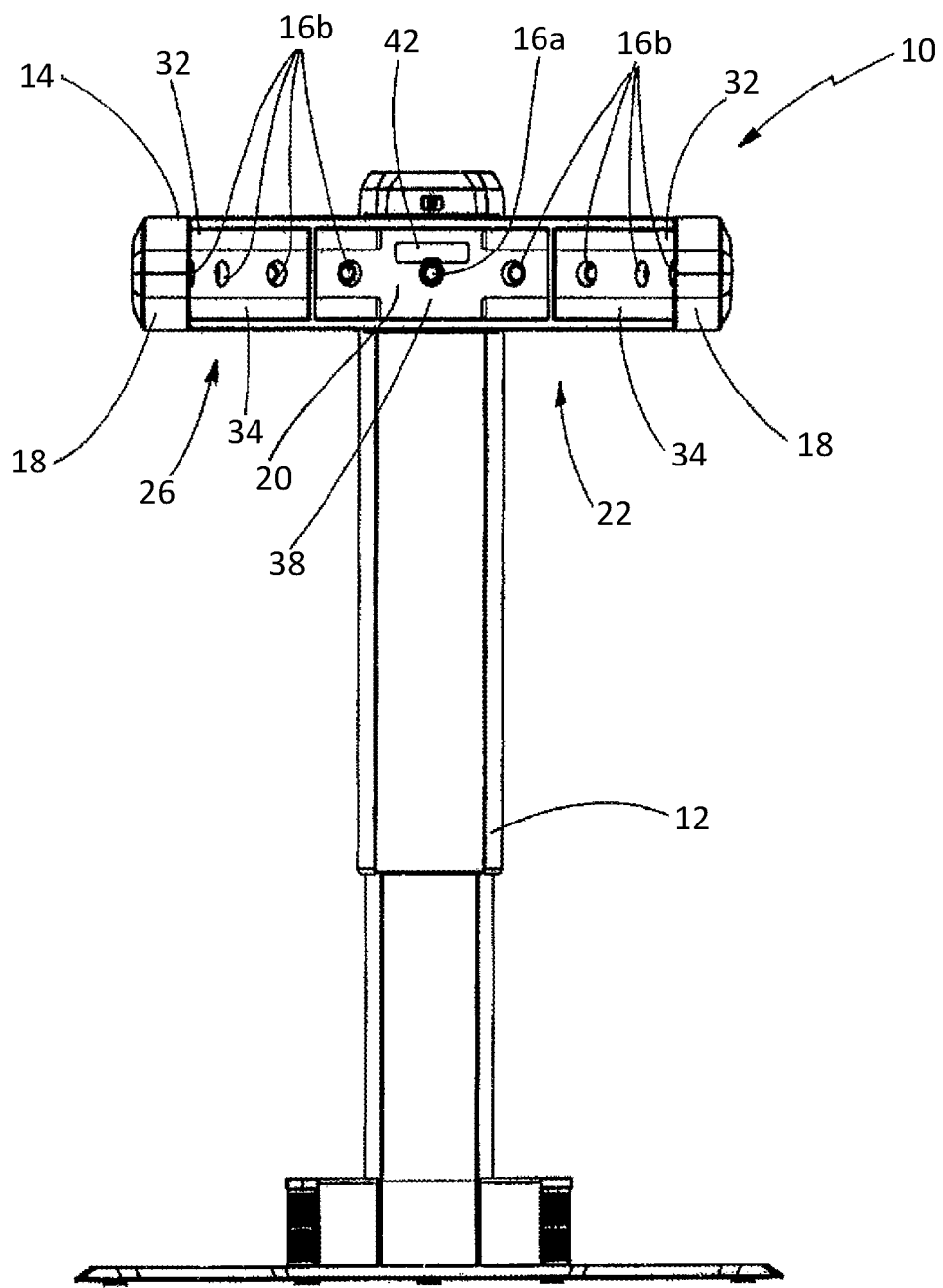
FIG. 1B shows an apparatus for determining centration parameters in a view from the front.

The apparatus 10 illustrated in the drawing serves to determine centration parameters for fitting spectacles. It has a column 12 which, in a height-adjustable manner, carries a rigid camera carrier 14 which, in turn, carries a number of cameras 16a, 16b. In a plan view, the camera carrier 14 is bent into an approximately circular shape and it extends between two free ends 18 which are arranged at a distance from one another. An inner face 20 of the camera carrier 14 encloses an interior 22, in which the head of a subject is situated when images are recorded by the cameras 16a, 16b, to the front, i.e., towards the column 12, and to the sides. In a direction extending between the free ends 18, the inner face 20 is bent in a concave manner and has, for example, the form of a portion of a lateral face of a cylinder, wherein the cylinder may have a circular or oval base. A lifting device, not illustrated in any more detail, is arranged in the column 12 to be able to position the camera carrier 14 at the correct height in relation to the head of the subject, it being possible to move the camera carrier 14 up-and-down in a motor-driven manner by way of the lifting device.

All cameras 16a, 16b are arranged in a camera arrangement 26 that extends between the free ends 18. In the present exemplary embodiment, the camera arrangement 26 is embodied as a camera row 26, the cameras 16a, 16b of which are all situated at the same height, with their optical axes being directed into the interior 22. In the present exemplary embodiment, the camera row 26 comprises a frontal camera 16a arranged in the center of the camera carrier 14, the optical axis of the frontal camera being directed frontally onto the face of the subject, and eight lateral cameras 16b that are arranged symmetrically in pairs in respect of a perpendicular plane of symmetry extending through the optical axis of the frontal camera 16a, four of the lateral cameras being directed onto the face of the subject from the left and four being directed onto the face of the subject from the right in each case. Moreover, the cameras 16a, 16b are calibrated in such a way that they are able to record calibrated images of the subject at the same time. The calibration comprises the extrinsic properties, such as the relative alignment of their optical axes and the relative arrangement with respect to one another in space, and their intrinsic properties, i.e., the properties of the cameras themselves, which define how a point in space, which is situated in the internal coordinate system of the respective camera, is mapped onto the coordinates of the pixels of the recorded image.

The camera carrier 14 only encloses the interior 22 to the front, towards the column 12, and to the sides, i.e., to the left and right of the head of the subject. Toward the top, the bottom and toward a rear side 30, the interior is open, wherein the free ends 18 have a distance from one another of at least 25 cm such that the subject can comfortably approach from the rear side. The distance is 70 to 80 cm in the shown exemplary embodiment.

To illuminate the interior 22, provision is made of an illumination device having an upper light strip 32 extending above the camera row 26 and a lower light strip 34 extending below the camera row 26, the light strips having a multiplicity of LEDs as lighting means in each case. The upper light strip 32 and the lower light strip 34 each extend, continuously or with interruptions, over a length which is at least as long as the length of the length of the camera row 26 as measured in the circumferential direction between the free ends 18. This corresponds to a circumferential angle of at least 160 degrees. Near the free ends 18, the upper light strip 32 and the lower light strip 34 are connected to one another, in each case by means of a further light strip 36 that extends in the vertical direction. Consequently, the camera row 26 is framed in the entirety thereof by at least one row of LEDs. The apparatus 10 moreover has an open-loop or closed-loop control device, not illustrated in any more detail in the drawing, by means of which the light intensity emitted by the LEDs can be controlled or regulated depending on the light intensity detected by the cameras 16a, 16b. Here, the LEDs of the light strips 32, 34, 36 are combined into sectors, the emitted light intensities of which can be controlled or regulated separately from one another. Moreover, provision is made for the light intensities emitted by the individual LEDs also to be able to be controlled or regulated separately from one another by means of the open-loop or closed-loop control device.

In order to be able to correctly position the subject in the interior 22, the two lateral cameras 16b closest to the frontal camera 16a are configured to measure the distance of the head of the subject from the center 38 of the camera carrier 14. The subject is shown whether or not they are standing correctly by means of a display unit, which is not illustrated in any more detail. The display unit has a plurality of differently colored light sources arranged in a row. The central light source lights up green when the subject stands correctly. Proceeding from the central light source, there is, in this sequence, a yellow, an orange and a red light source in each direction, the light sources indicating, in accordance with their color, if the subject is slightly, clearly or much too far away from the center 38 of the camera carrier 14 or if the subject stands slightly, clearly or much too close to the center 38. In order to ensure that the viewing direction of the subject is directed to infinity when determining the centration parameters, a fixation device 42 arranged at the camera carrier 14 is provided, the fixation device producing a fixation pattern in the form of a speckle pattern for the subject. The fixation pattern is arranged slightly higher than the frontal camera 16a so that the subject peers over the latter. In this way, their face can be recorded to the greatest possible extent.

The apparatus 10 is also suited, in particular, to produce an avatar of the head of the subject, which may be used for determining the centration parameters. To this end, calibrated images of the head of the subject without spectacles or spectacle frame are recorded by the cameras 16a, 16b. A depth profile of the head, which images the latter very well as an approximation, is created by means of a suitable process for a geometric determination of position, such as, triangulation. The head is imaged by a multiplicity of points which can be connected to one another by means of a mesh pattern or else be stored as a point cloud. In the subsequent determination of the centration parameters, the avatar thus ascertained may be used to determine centration parameters which cannot be determined, or can only be determined approximately, on account of the geometric properties of the spectacles or the spectacle frame worn by the subject. By way of example, a wide frame side may cover the eye in a lateral recording to such an extent that the vertex distance cannot be determined or can only be determined very inaccurately. Moreover, tinted or strongly reflecting spectacles may not allow the eyes to be identified, or only be identified very badly. To counteract this, the depth profile of the avatar is projected onto the images, recorded by the cameras 16a, 16b, of the subject wearing the spectacles or spectacle frame and the centration parameters, which can only be determined very unsatisfactorily on account of the sight being restricted by the spectacles or spectacle frame, are determined by means of the image data of the avatar. Here, for the purposes of minimizing deviations, the avatar may be fitted to the images of the subject wearing the spectacles or spectacle frame.

As an alternative or in addition to the production of the avatar, the apparatus 10 can be used as follows for carrying out a computer-implemented method for determining a representation of a spectacle frame edge or a representation of the edges of the lenses of a pair of spectacles.

Figure 2A:
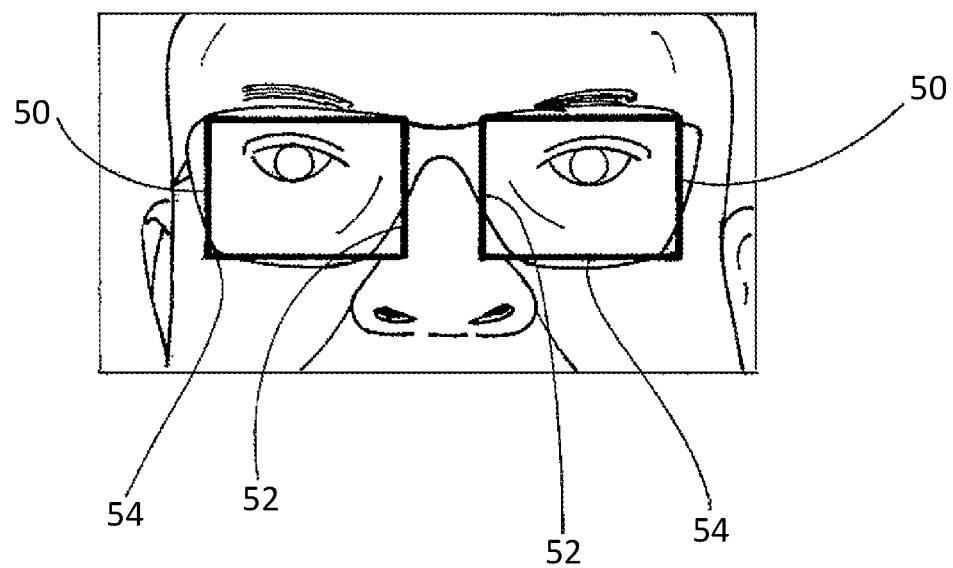
FIG. 2A shows a view from the front of a head wearing spectacles with approximated frame edges projected thereon.
Figure 2B:
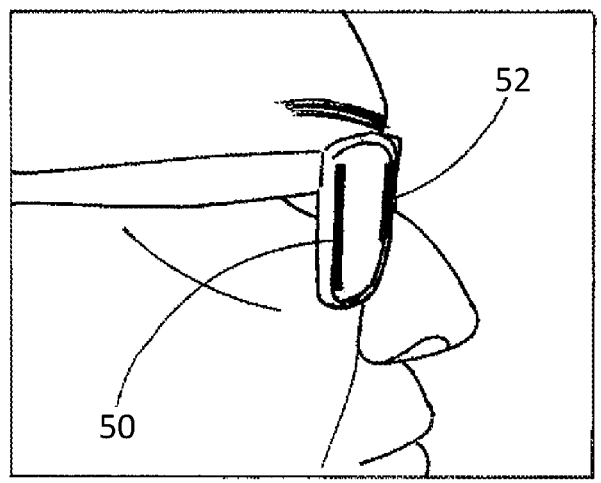
FIG. 2B shows a view from the side of a head wearing spectacles with approximated frame edges projected thereon.

Initially, images of a subject are recorded from the front (FIG. 2A) and from the side (FIG. 2B) by means of the frontal camera 16a and at least one of the lateral cameras 16b, with the subject wearing a pair of spectacles or a spectacle frame. Here, spectacle frame is also understood to mean the frame of rimless spectacles or semi-rimless spectacles, which have support panes instead of spectacle lenses. These images are made available in the method according to the disclosure, just like a three-dimensional model, based on geometric parameters of the spectacle frame or of the spectacles provided. The model is initialized using arbitrary parameters, albeit ones appearing expedient, and the frame edges or the lens edges are ascertained in three dimensions in the model. The ascertained frame or lens edges are projected onto the recorded images or onto a representation that reproduces the probability in the images of the corresponding pixel belonging to a frame or lens edge. The parameters of the model are assessed by means of a cost function and varied until the cost function assumes a minimum in a subsequent optimization process that optimizes the cost function. Here, as a simplification, the model can initially be assumed to have a geometry of the frame or of the spectacles as described in FIGS. 2A and 2B by means of temporal and nasal edges 50, 52. Approximately, as elucidated in FIG. 2, a lens plane can be placed through each temporal edge 50 and the associated nasal edge 52, the lens plane approximately mapping the spectacle lens in the model.

Figure 3:
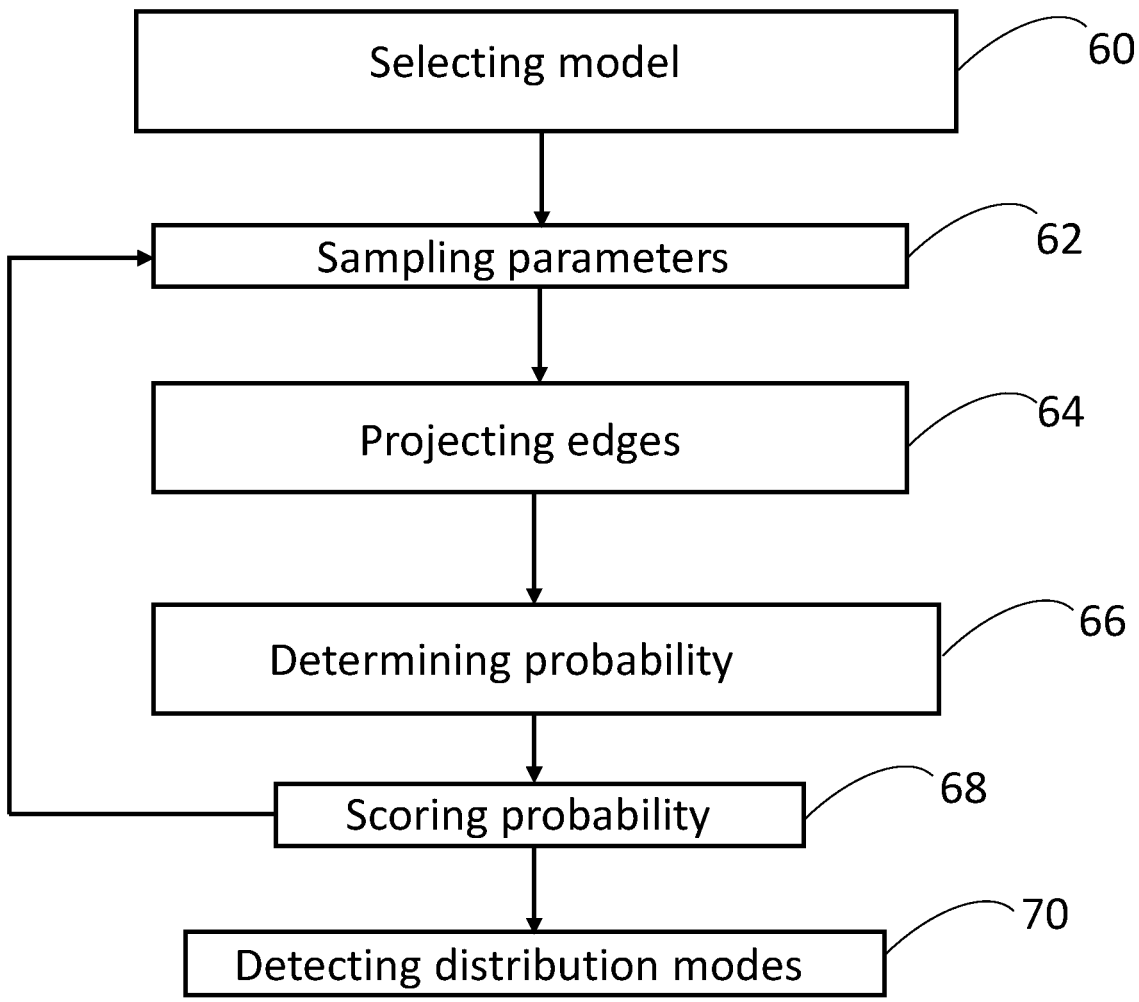
FIG. 3 shows a flowchart for elucidating a method according to an exemplary embodiment.

If use is made of a Markov chain Monte Carlo (MCMC) method, the progress of the method can be reproduced as elucidated in FIG. 3, for example.

Two planes that are symmetric to a central plane of the frame or the spectacles are selected as the model. Moreover, additional information is provided, such as the lens boxes in frontal image, probability maps for the edges on the basis of an edge detector learned with the aid of exemplary data in the lateral images and 3D position of the eyes (step 60). Centration parameters for a relatively large number of spectacles are known from a set of training data (e.g., from a multiplicity of known orders for spectacles). Statistics about the centration parameters can be calculated from these training data. The statistics about the centration parameters can be transferred to the parameters of the model, with the additional geometric prescriptions (e.g., position of the eyes, symmetry of the lens planes) being taken into account. As a result, it is possible to sample parameters from a given distribution (step 62) and calculate the probability for this parameter combination. (1st step in the MCMC optimization). By way of example, if a sampled pair of planes and the lens boxes 54 (see FIG. 2a) are provided in the frontal image, the lens boxes 54 can be projected onto the planes and, as a result, the lens boxes 54 can be obtained in three-dimensional coordinates. The edges of the three-dimensional lens boxes 54 can now be projected into the lateral images (step 64). Then, the projected edges can be compared to the edges in fact detected in the lateral image, for example by means of machine learning (random forest, deep learning, etc.) and by distance metrics (e.g., chamfer distance). The better the fit between the projected and the detected edges, the higher the probability that the sampled model in fact corresponds to the frame. This value is referred to as score (2nd step in the MCMC optimization; step 66). This result can be discarded (step 68), for example if the probability of the sampled parameters or of the sampled model and/or the score are too low.

The MCMC algorithm operates on the basis of generating a large number of plane samples, which simulates the probability density function of the model (on the basis of the parameter probability and score). Particularly many samples occur where parameter probability and score are high. In order, finally, to obtain the best model from this probability density for the current data record, the modes of this distribution are detected, for example using the mean shift algorithm (step 70). Then, the centration parameters and the edges, fitting to the chosen model, in the lateral images can be read directly from the results parameter set.

As an alternative thereto, other optimization methods can also be used. To this end, use can be made, for example, of the probability distribution over the parameters for the purposes of finding a suitable start value (e.g., mean value or median of the distribution) and suitable limit values for the parameters to be optimized.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-implemented method for determining a representation of a spectacle frame edge or a representation of edges of lenses of a pair of spectacles, the computer-implemented method comprising:
    providing at least two images, recorded from different directions of view, of a head of a subject wearing the spectacle frame or the pair of spectacles, wherein the at least two images are calibrated with respect to one another, and wherein the calibration includes extrinsic and intrinsic properties of a camera recording the images;
    determining data for at least parts of the edges of the spectacle frame or of the lenses in the at least two images to obtain detected edges;
    providing a three-dimensional model, based on geometric parameters, of the spectacle frame or of the pair of spectacles; and
    optimizing the geometric parameters for fitting the three-dimensional model to the detected edges.

2. The computer-implemented method as claimed in claim 1, further comprising:
    optimizing parameters defining a form of the spectacle frame or pair of spectacles and an orientation of the spectacle frame or the pair of spectacles in space.

3. The computer-implemented method as claimed in claim 1, further comprising:

simultaneously recording the at least two images of the head of the subject wearing the spectacle frame or the pair of spectacles from different directions of view with at least two cameras.

4. The computer-implemented method as claimed in claim 1, wherein the at least two images contain pixels, the computer-implemented method further comprising:
mapping a value of a probability of a respective pixel containing a part of the edges of the spectacle frame or of the lenses; and
assigning the value of the probability to the respective pixel.

5. The computer-implemented method as claimed in claim 4, further comprising:
calculating a probability map mapping the probability values for a plurality of pixels with machine learning.

6. The computer-implemented method as claimed in claim 1, wherein the geometric parameters of the three-dimensional model describe straight lines approximately defining nasal and/or temporal edges of the spectacle frame of the lenses.

7. The computer-implemented method as claimed in claim 1, wherein the three-dimensional model defines each frame edge or each lens as lying approximately in a plane, or wherein the three-dimensional model is represented as lying on a surface of order n or as a linear combination of surfaces of order n.

8. The computer-implemented method as claimed in claim 7, wherein the linear combination of surfaces of order n include at least one of a plane or a paraboloid or wherein the three-dimensional model is represented by a spline.

9. The computer-implemented method as claimed in claim 1, further comprising:
generating representations of the spectacle frame or of the lenses from the three-dimensional model; and
projecting the generated representations onto a recorded image of the subject.

10. The computer-implemented method as claimed in claim 9, wherein the representations of the spectacle frame or of the lenses image prominent regions of the spectacle frame or of the lenses.

11. The computer-implemented method as claimed in claim 10, further comprising:
optimizing the geometric parameters with a cost function.

12. The computer-implemented method as claimed in claim 11, wherein the cost function assesses a correspondence of the representations projected onto the recorded images.

13. The computer-implemented method as claimed in claim 12, further comprising:
optimizing a cost value ascertained by the cost function.

14. The computer-implemented method as claimed in claim 1, wherein the position of the eyes in space is determined on a basis of the at least two images with a geometric determination of position, and wherein parameters defining the position of the eyes are incorporated into the three-dimensional model.

15. The computer-implemented method as claimed in claim 1, further comprising performing at least one of:
restricting a value range of the geometric parameters;
limiting a number of geometric parameters;
prescribing assumptions, statistics, or the assumptions and the statistics in respect of the geometry of the spectacle frame or of the lenses; or
prescribing the assumptions, the statistics, or the assumptions and the statistics in respect of facial features, frame features, or facial and frame features in the images.

16. The computer-implemented method as claimed in claim 1, wherein the three-dimensional model contains a probability distribution specifying probabilities for possible values of the geometric parameters.

17. A computer program stored on a non-transitory storage medium and having program code for carrying out the method as claimed in claim 1, when the computer program is loaded onto a computer and/or executed on the computer.

18. A method of operating an apparatus configured to carry out the computer-implemented method as claimed in claim 1, the method comprising:
illuminating an interior of the apparatus, wherein the apparatus includes a camera carrier, which partly encloses the interior,
wherein the partly enclosed interior is open to a top side, a bottom side, and a rear side of the apparatus,
wherein the camera carrier carries at least three cameras which are arranged between two free ends of the camera carrier and directed into the partly enclosed interior, and
wherein the camera carrier includes an illumination device configured to illuminate the partly enclosed interior.

19. A method for centering at least one spectacle lens in a spectacle frame, the method comprising:
determining centration parameters for the spectacle lens by ascertaining the representation of the edge of the spectacle lens or the representation of the spectacle frame edge with the method as claimed in claim 1, and
centering the at least one spectacle lens with the determined centration parameters in the spectacle frame.

20. A method for producing a pair of spectacles, comprising centering the least one spectacle lens as claimed in claim 19.

21. A method for grinding at least one spectacle lens into a spectacle frame, the method comprising:
determining centration parameters for the spectacle lens by ascertaining the representation of the edge of the spectacle lens or the representation of the spectacle frame edge with the method as claimed in claim 1; and
grinding the at least one spectacle lens for an arrangement in the spectacle frame on the basis of the determined centration parameters.

22. A method for producing a spectacle lens, comprising grinding the spectacle lens into the spectacle frame according to claim 21.

23. An apparatus for determining a representation of a spectacle frame edge or a representation of the edges of the lenses of a pair of spectacles, the apparatus comprising:
a first camera configured to record a first image from a first direction of view,
a second camera, calibrated with respect to the first camera, configured to record a second image from a second direction of view that differs from the first direction of view, wherein the calibration includes extrinsic and intrinsic properties of the first camera and of the second camera; and
a computer having a non-transitory storage medium on which a computer program is stored and a processor for executing the computer program stored on the non-transitory storage medium, the computer program having program code causing the apparatus to:

determine data in the first image and the second image for at least parts of the edges of the spectacle frame or of the edges of the lenses;

provide at least two calibrated images, recorded from different directions of view, of a head of a subject wearing the spectacle frame or the pair of spectacles, provide a three-dimensional model, based on geometric parameters, of the spectacle frame or of the pair of spectacles; and optimize the geometric parameters to fit the three-dimensional model to the detected edges.

\* \* \* \* \*